United States Patent [19]
Hug et al.

[11] Patent Number: 5,091,273
[45] Date of Patent: Feb. 25, 1992

[54] METHOD OF APPLYING A TAIL WRAP TO A WOUND ELECTROCHEMICAL CELL AND CELL PRODUCED BY THE METHOD

[75] Inventors: Leonard F. Hug, Arvada; Martyn Sutton, Littleton, both of Colo.

[73] Assignee: Optima Batteries, Inc., Denver, Colo.

[21] Appl. No.: 536,927

[22] Filed: Jun. 11, 1990

[51] Int. Cl.$^5$ .............................................. H01M 2/02
[52] U.S. Cl. ..................................... 429/94; 429/131; 29/623.4
[58] Field of Search ................... 429/94, 131; 29/623.4

[56] References Cited

U.S. PATENT DOCUMENTS

| | | |
|---|---|---|
| 4,112,202 | 9/1978 | Hug et al. ............................. 429/94 |
| 4,402,784 | 9/1983 | Romero-Medrano ............. 29/623.1 |
| 4,664,979 | 5/1987 | Johnson ................................. 429/94 |
| 4,802,275 | 2/1989 | Freluche ................................ 429/94 |
| 4,963,445 | 10/1990 | Marple et al. ........................ 429/94 |

*Primary Examiner*—Stephen Kalafut
*Attorney, Agent, or Firm*—C. H. Castleman, Jr.; J. L. Isaac; H. W. Oberg

[57] ABSTRACT

In an electrochemical wound cell having a negative and positive plate strip, and at least one inorganic separator interleaved between the plates, the improvement comprising: a thin sheet of flexible material having a leading and trailing end, the sheet wrapped around the wound cell and heat softened to attach the trailing end to a portion of the sheet between the leading and trailing ends. A method for making the electrochemical cell characterized herein is also described.

16 Claims, 2 Drawing Sheets

METHOD OF APPLYING A TAIL WRAP TO A WOUND ELECTROCHEMICAL CELL AND CELL PRODUCED BY THE METHOD

BACKGROUND OF THE INVENTION

In general, this invention relates to a method for applying a tail wrap to a wound electrochemical cell, in particular, to an electrochemical cell for a lead acid battery. Such an electrochemical cell will have flexible strip members wound into a generally cylindrical or jelly roll configuration to form a wound cell pack. The flexible strip members will include a positive electrode, a negative electrode, and one or more separators. The flexible strip members are typically wound about a mandrel and secured in their wound configuration so that they may be inserted into a cell casing with ease.

Various techniques and apparatus for securing the wound configuration of the flexible strip members into a wound cell pack are known. In U.S. Pat. No. 4,802,275 hot melt glue is used to secure one of the separators or the negative electrode to itself during the end of the winding operation. However, this securing technique is difficult to achieve when using a separator which will not bond readily to the hot melted glue. Also, when hot melt glue is applied to one of the electrodes to secure the cell pack, the danger arises that the glue on the electrode could adhere or stick to various other elements. As it is necessary to deposit the hot melted glue outside of the winding operation, the time required before attachment to the electrode can affect the reliability of the glue bond. Thus, the glue can dry quickly and prevent a secure attachment. Using an electrode for the final wrap of the wound cell pack can leave the electrode exposed for damage upon insertion into the cell casing. Also, the final capacity of the cell can be adversely affected by using the melt glue.

Another method for securing a wound cell pack is shown in U.S. Pat. No. 4,402,784. In this patent, an end of one of the separators of the wound cell pack is heat sealed to itself during the last part of the wind by means of flexible heat sealing fingers. This method of securing a wound cell pack cannot be used with all separators. Certain separators are not easily bondable to themselves or to organic materials. In particular, separators which are formed of fiber glass or a glass mat reject heat sealing back onto themselves.

In the past, other securing techniques for cell packs have been used which require the attachment of additional items to the wound cell pack to maintain its configuration. For example, an operator can manually apply a securing strip of suitable plastic tape to the outside diameter of the wound cell pack prior to ejection of the wound roll from the winding mandrel. This method of securement results in a relatively slow rate of production and a high cost of operation due to the manual operation. This method slows down the rate at which the wound cell packs are produced. Factors such as operator error and variations in operator technique can also influence the end product.

U.S. Pat. No. 4,064,725 discloses a further prior art approach to securing the wound cell pack. In this patent, one end of a piece of tail wrap material is attached to one of the separators by tape. The other end of the piece of tail wrap material has a binder comprising double-sided tape attached to it. As the tail wrap material is wrapped around the cell pack, it adheres onto itself with the aid of the binder to constrict the wound cell pack to its generally cylindrical configuration. This patent, however, also requires manual operation to secure the wound cell pack. It is necessary for the tail wrap to be taped initially to the separator and then it is necessary to apply the binder or double-sided tape to the tail wrap before it can be wrapped around the wound cell pack. This method of securing the wound cell pack is also difficult to achieve in cell packs where the separator resists the tape attachment. If the tape adhesive does not adhere properly to the separator, failure in securing the wound cell pack would result.

SUMMARY OF THE INVENTION

It is an object of the instant invention to secure a wound cell pack for an electrochemical cell having a separator formed of a mat of inorganic material not easily bondable to itself or to organic materials. It is a further object of the invention to secure the wound cell pack for a lead acid battery by using a tail wrap.

Another object of the invention is to decrease the production time required for each cell pack by inserting a tail wrap between one of the plates and one of the separators during the winding operation of the cell pack. This will decrease operator time and functions for each cell pack.

It is a further object of the invention to secure a wound cell pack for an electrochemical cell by using a tail wrap which does not affect the capacity of the resulting cell.

Briefly described, the invention relates to the method of making an electrochemical cell comprising the steps of providing a negative plate strip having at least one major surface, providing a positive plate strip having at least one major surface, interleaving at least one separator formed of a mat of inorganic material not easily bondable to itself or to organic materials interleaved between said surfaces of the said plates, winding said plates and said separator so as to form a wound cell pack, wrapping a thin heat deformable flexible sheet having a leading end and a trailing end around said wound cell pack, heat sealing said trailing end of said sheet to a portion of said sheet between said leading end and said trailing end so as to secure and maintain said wound cell pack. Also, the invention includes an electrochemical cell produced by the above method having a tail wrap for securing the wound cell pack. The tail wrap is heat sealed to itself to maintain the wound cell pack for insertion in a cell casing.

BRIEF DESCRIPTION OF THE DRAWINGS

The invention in its preferred embodiments will be more particularly described by reference to the accompanying drawings in which like numerals designate like parts.

PREFERRED EMBODIMENTS OF THE INVENTION

The invention will be described in conjunction with the manufacture of spirally wound cell packs of the lead-acid rechargeable type. However, the invention is not so limited and broadly applies to spirally wound cell packs for use in various types of electrochemical cells.

Figure 1:
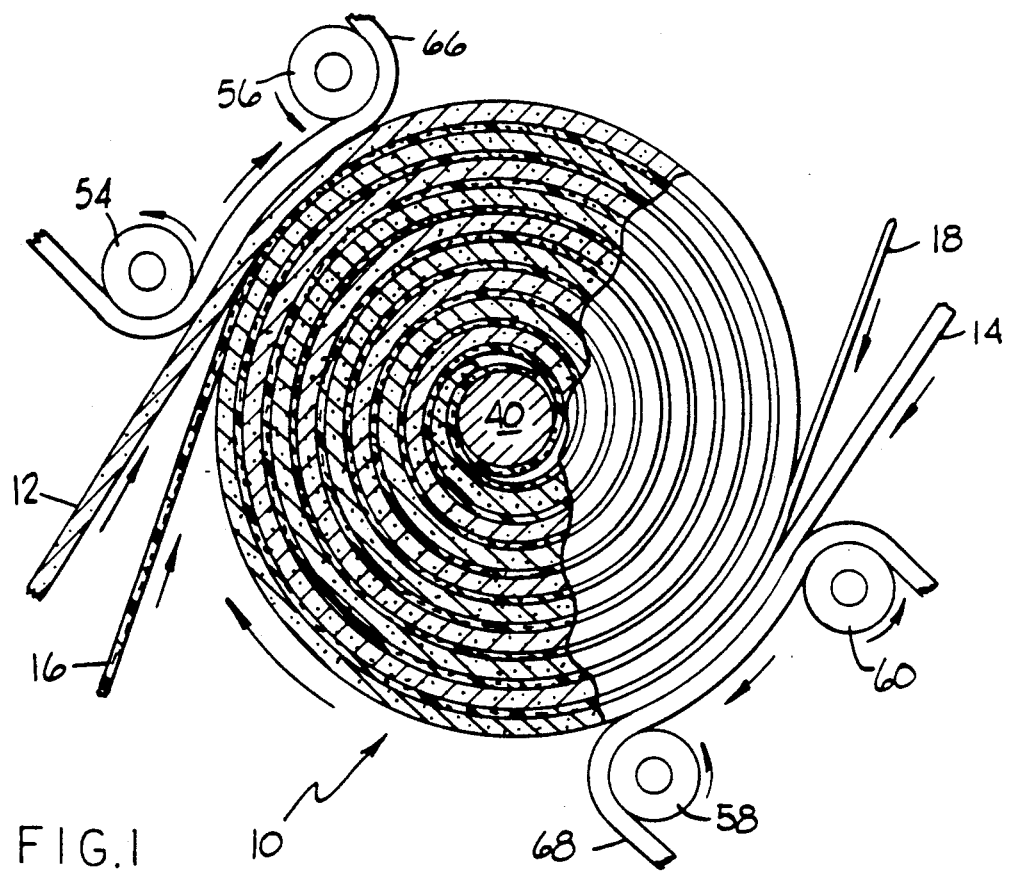
FIG. 1 is a partially broken away side view of the winding mandrel and cell components during the winding of the cell pack before the insertion of the tail wrap.

The electrochemical cell pack and its components are shown generally at 10 in FIG. 1. The cell sub-assembly or cell pack comprises a flexible positive plate strip 12, a flexible negative plate strip 14, and one or more interleaved compressible separator members 16 and 18. These components are formed in a jelly roll spiral configuration under a suitable winding tension and are retained in this mutual compressive relationship by a tail member 20, FIG. 2, which is wrapped circumferentially about the cell pack.

Each of the electrode plate strips 12 and 14 include a grid substrate which may be in perforated form, expanded mesh, woven wire screen or other suitable form and onto which is applied a uniform layer of electrochemically active paste such as lead oxide. The paste forms a surface layer on either side of the grid as well as impregnating the interstices in the grid substrate. The plate also carries a plurality of spaced radially aligned positive current collector tabs (not shown) and negative tabs (not shown) as is well known in the art.

Each of the separators, 16 and 18, comprises a compressible glass mat such as fiber glass or fine glass strands in a porous structure. The separators are heat impervious and not easily bondable to themselves or to organic materials.

The separators are designed to retain the bulk of the electrolyte employed in the cell, having a porosity in an uncompressed state of from about 60 to 95 percent, more preferably from about 70 to about 92 percent. The separator material should be chosen to have a very high heat of wetting and coupled with this, a large surface area which together define an absorptive power even greater than that of the plate strips. A high surface area siliceous material is preferred. A separator material which in practice has offered these features is formed of a mat of ultrafine (microdiameter) glass fibers intermingled to form a compressible sheet or mat. To achieve the high surface area required, the major portion by weight of the high heat of wetting fibers (e.g. glass) have diameters of less than about 3 micron, more preferably less than about 0.9 micron. Various grades of coarser and finer materials may be incorporated with the above-mentioned ultra-fine fibers. For instance, a typical mat may have from about 75 to about 85 percent by weight of 0.6 micron, from about 5 to about 15 percent by weight of 3 micron fiber, and rovings to provide added strength to the mat in an amount from about 3 to about 10 percent by weight having diameters from about 7 to about 20 microns. The mats preferably have surface areas from about 0.1 to about 20 square meters per gram of fiber material (silica in the case of glass). The separator can also be in the form of relatively large diameter rovings, to provide the required tensile strength for the separator, loaded with ultrafine siliceous particles such as diatomile or perlite to provide the necessary high surface area.

The cell pack comprising the positive plate strip 12, the negative plate strip 14, and the separators 16 and 18 are wound on a winding mandrel 40. The mandrel 40 may be round in shape or have a shaped configuration to seat the plates. The mandrel also may be a split mandrel or any other configuration that is well known in the art and which can be employed to wind a spiral cell pack according to the invention. The mandrel 40 consists of a generally circular body portion or shaft mountable for free turning. The mandrel receives the leading edges of the cell plate strips to be wound. A pair of free turning pressure rollers 54, 56, 58 and 60 laterally straddle the center line of the winding mandrel. Flexible endless belt driving surfaces 66 and 68 come into contact with the leading edges of the plates and the separators. The plates and separators are fed tangentially to the mandrel from feeding mechanisms and the plates and separators do not come into contact with one another substantially until the point of contact tangentially with the mandrel, and then within the winds of the cell pack as winding proceeds. The winding belts 66 and 68 are flexible and compressible enough to take on a significant curvature against the sandwiched plate and separator. As the winding belts are driven, the components spirally wind upon each other and upon the mandrel. The components are fed substantially in a straight line gently to the winding cell pack, and the components spirally wind upon each other. The belt driving surfaces are maintained at desired tension so to cause the cell pack to be spirally wound in a pre-determined fashion. The driving belts 66 and 68 are at least partially deflected throughout the wind producing a curve portion between rolls 54, 56, 58, and 60 and therefore offer a large contact area for winding. The positioning of roller pairs 54, 56, 58, and 60 insures obtaining a cell pack of controlled diameter. During the entire winding operation, at least one or both of the individual rollers of each of these rollers pairs apply direct pressure through the interposed belt against the separators and plates being wound permitting accurate mechanical control of plate spacing and final diameter.

Figure 3:
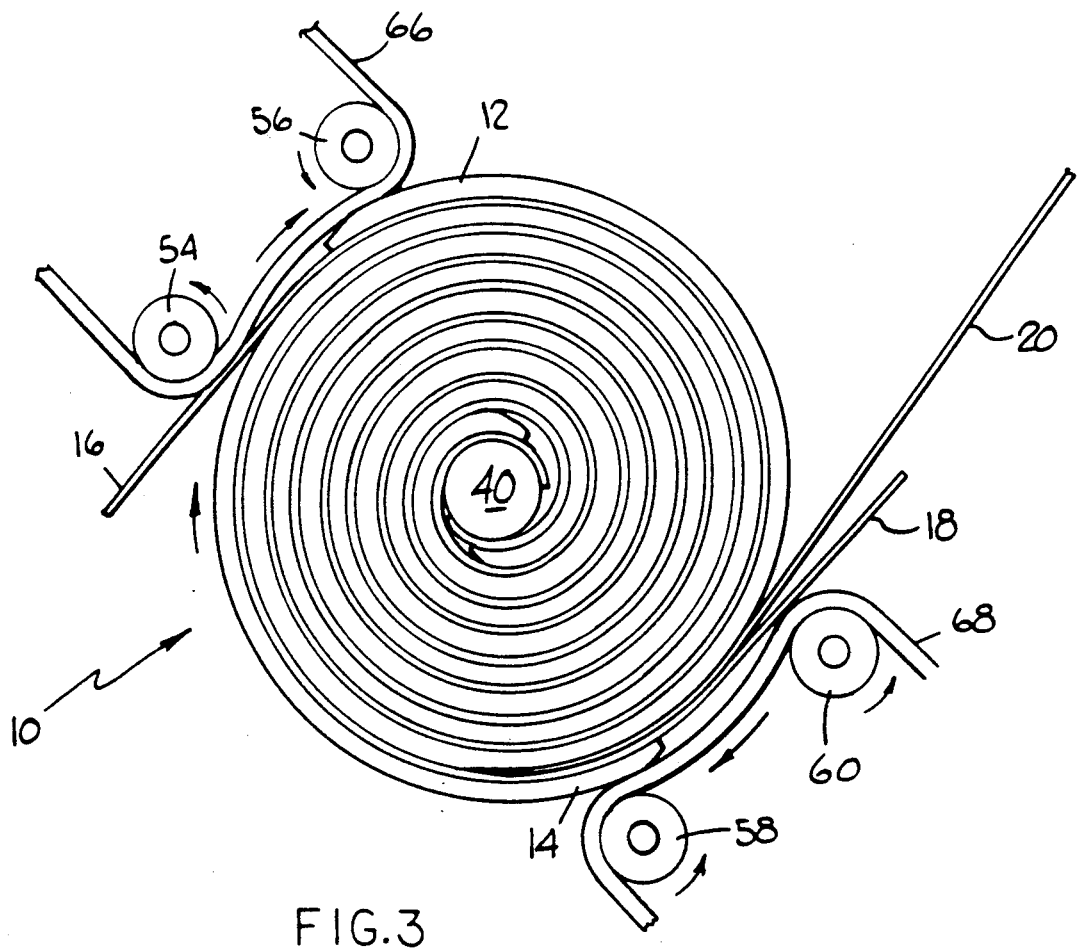
FIG. 3 is a side view of the winding mandrel and cell components during the winding of the cell pack showing the insertion of the tail wrap.

At an appropriate time before the end of the wind of the cell pack, a pre-cut tail wrap 20, shown in FIG. 3, is fed between the positive electrode 12 and the negative separator 18. The tail wrap 20 acts as a retainer for the wound components so as to prevent unwinding. In the final step upon completion of the feeding of the plate strips and separators, the tail wrap 20 between separator 18 and electrode 12 continues to wind about the cell pack. Driving belts 66 and 68 and pressure rollers 54, 56, 58 and 60 exert pressure on the tail wrap and guide it in a full circumferential winding about the cell pack.

Figure 2:
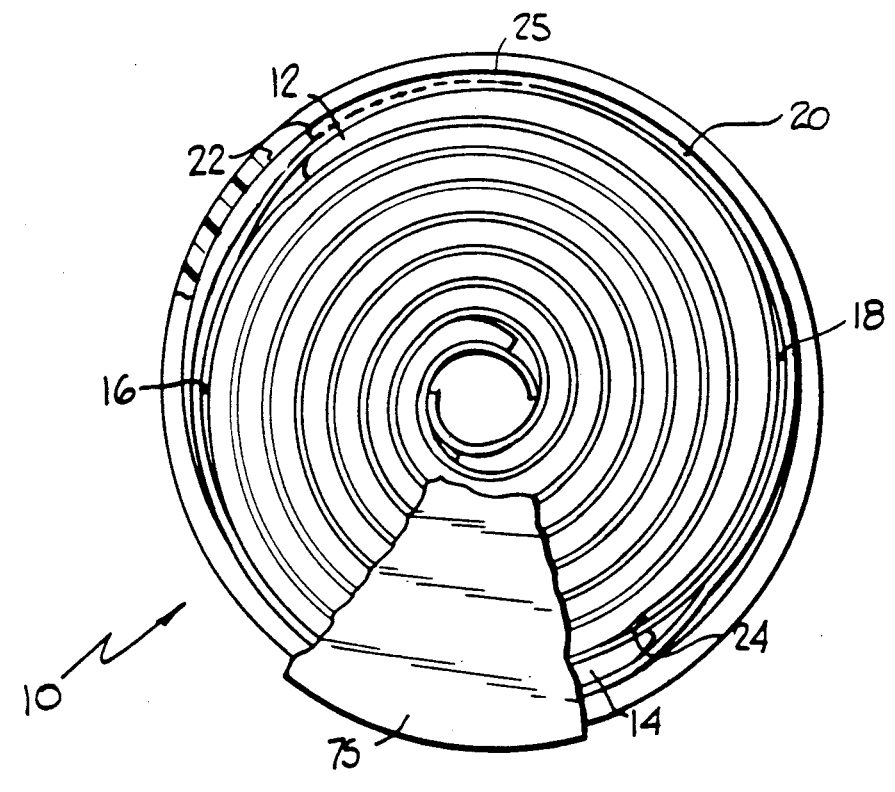
FIG. 2 is an partially broken away top view of the cell showing the completed cell pack components.

The finished wound and wrapped cell is shown in FIG. 2. Leading end 24 of the tail wrap 20 is caught between plate 12 and separator 18. The tail wrap 20 forms an overlap with itself around the circumference of the cell and contacts itself beyond separator 18 for a distance sufficient to provide an effective heat seal. The distance can range from 15 degrees to 360 degrees around the circumference of the cell pack. Preferably the tail wrap contacts itself for at least about 15 degrees around the circumference of the cell pack beyond separator 18. More preferably the contact distance is up to about 65 degrees around the circumference of the cell pack. Most preferably the tail wrap contacts itself for approximately 45 degrees around the circumference of the cell pack beyond separator 18. It is then heat sealed in place near trailing end 22 before ejection from the mandrel. The heat seal area of the finished cell pack is shown at 25 in FIG. 2.

Figure 4:
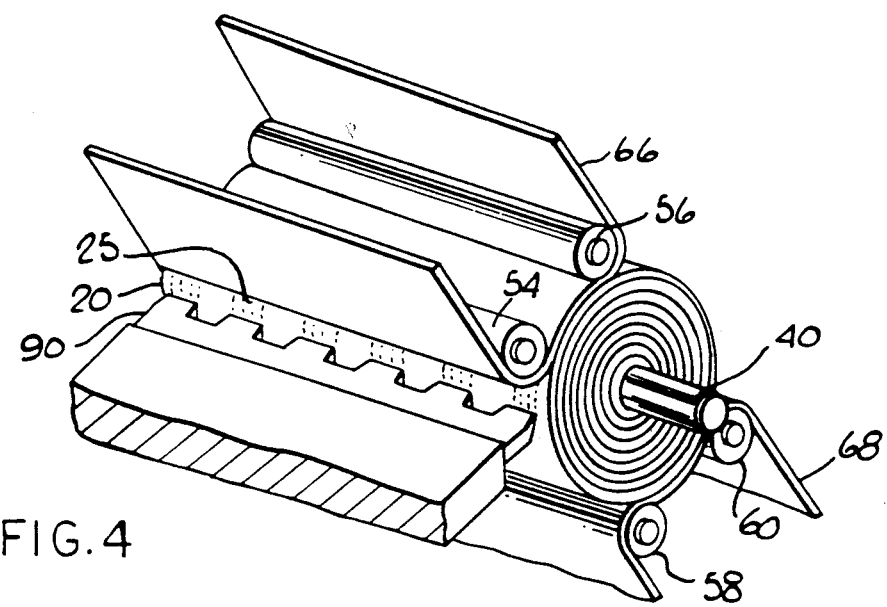
FIG. 4 is a perspective overview of the cell pack and the heat sealing apparatus in contact therewith.

FIG. 4 shows the cell pack winding in perspective. A positive electrode strip and a negative electrode strip are fed through well known feeding and guiding mechanisms to the winding mandrel as shown in FIG. 1. The separators are likewise fed through well known feeding and guiding mechanisms to the winding mandrel. The separators and electrodes are wound around the mandrel in a compressed manner. A pre-cut tail wrap 20 is fed to the sandwiched plate strips and separators by means of a feed mechanism. At an appropriate time before the completion of the winding of the plate strips and separators, pre-cut tail wrap 20 is fed to the winding cell pack. Tail wrap 20 is fed between the positive electrode and the negative separator by well-known means. During the last stages of the wind, tail wrap only remains to be wound about the compressed cell pack and the tail wrap alone is in contact with driving belts 66 and 68 driven by rollers 54, 56, 58 and 60.

Heat sealing head 90 is provided for heat sealing the tail wrap to itself. The tail wrap is of sufficient length so that the tail wrap will lay in contact upon itself for a distance sufficient for the heat seal. The heat seal head at an appropriate time will move to contact the winding cell by well known means such as an air cylinder.

Upon contact with the winding cell pack, the heat seal head will contact the cell pack about the circumference of the pack and will seal the tail wrap to itself. The heat seal head will then retract back to its original retracted position. This will heat deform the tail wrap material at 25 so that the material will be melted back upon itself. In the preferred embodiment the tail wrap comprises a thin sheet of flexible material, preferably a thermoplastic material, that is capable of being heat softened, such as a polypropylene or polyethylene material.

The heat seal head 90 of the instant invention in the preferred embodiment comprises a heated configured bar. Metal flexible strips can also be used as well as any heat sealer which can reach a sufficiently elevated temperature to melt or heat deform the thermoplastic material. The configured bar will produce heat seal portions spaced at intervals along a dimension of the tail wrap parallel to the winding mandrel i.e. a plurality of heat softened portions (becoming heat sealed upon cooling) are produced at spaced intervals along a dimension of the tail wrap lying perpendicular to a line drawn between the leading and trailing edges of the tail wrap. The configured bar can produce temperatures that can be regulated, and thus eliminate any tendency to overheat and deform the tail wrap.

The heat seal portion extends around the circumference of the wound cell for a distance determined by the contact with the heat seal head. The distance can be any sufficient length to allow the tail wrap to seal to itself and provide smooth and positive movement for the heat seal head. The heat seal head contacts the cell pack for a distance that can range from about 45 degrees to 210 degrees circumferentially. Preferably the heat seal head contacts the cell pack for a distance of at least 45 degrees circumferentially. More preferably the distance is 210 degrees circumferentially. Most preferably the heat seal head contacts the cell pack for a distance of approximately 180 degrees circumferentially. In the preferred embodiment the heat seal head contacts the winding cell pack for approximately 180 degrees. The tail wrap is overlapped onto itself for approximately 45 degrees about the circumference of the cell pack. Thus the heat seal head would be assured of contacting the tail wrap at its overlapped portion. After heat sealing the heat seal mechanism is retracted to its original position and the winding cell is ejected from the winding mandrel as is well known in the art.

Typically the spirally wound cell pack is earmarked for use in a lead acid cell and will be sealed in a suitable acid resistant container 75 (FIG. 2) which may be made of polypropylene for instance. Electrode tabs are connected to the positive and negative terminals (not shown) and acid is then added to make the cell ready for formation change and use.

The resulting electrochemical cell will remain in a compressed and wound state by means of the tail wrap during the above procedures. The tail wrap, in turn, although inserted during the final portion of the wind of the cell, will not affect the resulting cell electrochemistry and/or characteristics.

It will be understood that the invention is capable of a variety of modifications and variations which will become apparent to those skilled in the art upon a reading of the specification. For example, although the preferred embodiment describes a spirally wound cell pack it is understood that the method could be used to secure wound cell packs of various shapes. Thus the tail wrap of the instant invention can be used to secure a flat wound cell pack, and a cell pack employing U-shaped interleaved electrodes. Such modifications are intended to be part of the invention as defined in the appended claims.

What is claimed is:

1. An electrochemical cell, said cell having a negative plate strip having at least one major surface, a positive plate strip having at least one major surface, at least one separator formed of a mat of inorganic material not easily bondable to itself or to organic materials interleaved between said surfaces of said plates, said plates and said separator forming a wound cell pack, the improvement comprising, a thin sheet of flexible material, capable of being heat softened, wrapped around said wound cell pack to secure said wound cell pack from unwinding, said sheet having a leading end and a trailing end, said sheet having at least one heat softened portion near said trailing end to attach said trailing end to a portion of said sheet between said leading and trailing ends.

2. The electrochemical cell of claim 1 wherein said leading end of said sheet lies between said separator and one of said plate strips.

3. The cell of claim 1 wherein said wound cell pack is spirally wound and said sheet is wrapped around said spirally wound cell pack.

4. The cell of claim 3 wherein said heat softened portion extends circumferentially around said spirally wound cell pack.

5. The cell of claim 1 comprising a plurality of heat softened portions and wherein said heat softened portions are at spaced intervals along a dimension of said sheet lying perpendicular to a line drawn between said leading end and said trailing end.

6. The cell of claim 1 wherein said sheet is a thermoplastic material.

7. The cell of claim 6 wherein said sheet is polypropylene.

8. The cell of claim 6 wherein said sheet is polyethylene.

9. A method for making an electrochemical cell comprising the steps of
providing a negative plate strip having at least one major surface;

providing a positive plate strip having at least one major surface;

interleaving at least one separator formed of a mat of inorganic material not easily bondable to itself or to organic materials between said major surface of said positive plate and said major surface of said negative plate strip;

winding said plates and said separator so as to form a wound cell pack;

wrapping a thin, heat deformable, flexible sheet, having a leading end and a trailing end, around said wound cell pack; and heat sealing said trailing end of said sheet to a portion of said sheet between said leading end and said trailing end, so as to secure said wound cell pack from unwinding.

10. The method of claim 9 wherein said step of winding further comprises the step of inserting said leading end of said sheet between said separator and one of said plate strips during a portion of the wind.

11. The method claim 9 wherein said step of winding further comprises the step of spirally winding said strips and said separator so as to form a spirally wound cell pack.

12. The method of claim 9 wherein said step of heat sealing further comprises the step of advancing a heat seal head into contact with said sheet near said trailing end.

13. The method of claim 9 wherein pursuant to said heat sealing step heat seal portions are produced which are spaced at intervals along a dimension of the tail wrap parallel to the axis of the wound cell pack.

14. The method of claim 9 wherein heat sealing is effected by contacting the wound cell pack while it is rotating with a heat seal head, the heat seal head contacting the cell pack during rotation for a distance from about 45 degrees to about 210 degrees circumferentially about the cell pack.

15. The method of claim 9 wherein the separator is formed of a compressible mat of ultrafine glass fibers.

16. The cell of claim 1 wherein the separator is formed of a compressible mat of glass fibers.

* * * * *